(12) United States Patent
Yi

(10) Patent No.: US 7,233,657 B2
(45) Date of Patent: Jun. 19, 2007

(54) METHOD FOR OPERATING AND TRANSLATING SCCP GLOBAL TITLES

(75) Inventor: Seung Hee Yi, Anyang-shi (KR)

(73) Assignee: LG Nortel Co., Ltd., Seoul (KR)

( * ) Notice: Subject to any disclaimer, the term of this patent is extended or adjusted under 35 U.S.C. 154(b) by 229 days.

(21) Appl. No.: 10/321,594

(22) Filed: Dec. 18, 2002

(65) Prior Publication Data

US 2003/0118012 A1 Jun. 26, 2003

(30) Foreign Application Priority Data

Dec. 20, 2001 (KR) ............................. 2001-81629

(51) Int. Cl.
*H04M 7/00* (2006.01)
(52) U.S. Cl. .................. 379/229; 379/230; 370/360; 370/389; 370/522
(58) Field of Classification Search ............... 379/229, 379/230; 370/522, 360, 389
See application file for complete search history.

(56) References Cited

U.S. PATENT DOCUMENTS 5,862,129 A * 1/1999 Bell et al. .................. 370/236
5,894,574 A 4/1999 Whited ....................... 395/701
5,930,706 A * 7/1999 Raith ....................... 455/422.1
5,940,492 A 8/1999 Galloway et al. ........... 379/230
6,175,574 B1 * 1/2001 Lewis ........................ 370/522
6,377,614 B1 4/2002 Yamashita .................. 375/149
6,377,674 B1 * 4/2002 Chong et al. ................ 379/230
6,775,234 B1 * 8/2004 Garcia-Martin ............. 370/237
6,785,378 B2 * 8/2004 Mar ........................... 379/229

* cited by examiner

*Primary Examiner*—Quynh H. Nguyen
(74) *Attorney, Agent, or Firm*—Ked & Associates, LLP

(57) ABSTRACT

A method for operating and translating SCCP global titles to implement the global roaming uses a signal message routing based upon the SCCP global title. According to one embodiment of the present invention, if a received signal message is routed according to the global title, the required global title translation is for global roaming is determined by detecting whether a local global title has been defined in the received signal message. If the translation is to be made for global roaming, then the types of global title translations to be conducted are determined among the country code global title translation, the network code global title translation and the mobile subscriber identification number global title translation based upon whether the country code and/or the network code of the local global code are identical with those of the global code to be translated. In this manner, the present invention may implement the efficient SCCP global title translation while supporting the global roaming.

30 Claims, 6 Drawing Sheets

Fig.1
(Related Art)

| 8 | 7 | 6 | 5 | 4 | 3 | 2 | 1 |
|---|---|---|---|---|---|---|---|
| Reserved for national use | Routing indicator | \multicolumn{4}{c|}{Global title indicator} | SSN indicator | Point code indicator |

METHOD FOR OPERATING AND TRANSLATING SCCP GLOBAL TITLES

BACKGROUND OF THE INVENTION

1. Field of the Invention

The present invention relates to a method for operating and translating Signaling Connection Control Part (SCCP) global titles. More particularly, the invention relates to the method for operating and translating SCCP global titles that may implement global roaming covering various mobile communication carriers and various countries by conducting signal message routing in accordance with the relevant SCCP global titles.

2. Background of the Related Art

The methods for routing SCCP signal messages in a No. 7 signal network in the related art may be classified as follows: the method based upon the sub-system number (SSN) and the method based upon the global title.

The type of routing method (i.e., whether an SCCP signal message will be routed according to the SSN or the global title) is determined through the routing indicator included in the address indicator field of the relevant SCCP signal message as illustrated in FIG. 1.

If an SCCP signal message is to be routed according to the global title, a node (or nodes) for translating the global title is (are) required. The global title translation may be conducted at a signal message origin, a signaling transfer point (STP), or at a signal message origin (for the first translation) and a STP (for the second translation).

For example, if an SCCP signal message is transmitted from the signal point A to the signal point F through the global title routing in a No. 7 signal network illustrated in FIG. 2, the global title translation is conducted at (i) the signal point A (the signal message origin); (ii) one of the signal points B, C, D or E (the STP); or (iii) the signal point A (the signal message origin for the first translation) and one of the signal points B, C, D or E (the STP for the second translation).

Generally, among the three types described above, the type of global title translation to be used in a network is determined when the signal network is structured. Then, the signal network administrator maintains and manages the information regarding the global title translation.

FIG. 3 shows the generally used method of global title translation conducted at a node translating the global translation.

When a global title is inputted into a global title translation module, the module searches the global title translation database to find whether the database contains a global title that is identical with the inputted global title.

If there exists an identical global title in the global title translation database, the module translates the global title into the corresponding routing information and outputs the translated global title.

As described above, for the translation of an SCCP global title according to the technologies available in the related art, it is required that all the global titles intended to be used in a network should be maintained and managed in a global title translation database because the global title translation database must be searched to locate the relevant global title translation. Thus, the size of the global title translation database tends to be extremely large and it takes a great length of time to search such a database. These are some of the problems of the global title translation methods of the related art.

In order to provide global roaming services covering various mobile communication carriers and various countries (i.e., the mobile communication services to be supported in the 3rd generation mobile communication system such as the IMT-2000, through which a subscriber may use mobile communication services irrespective of which mobile communication carrier he has contracted with, which country he has subscribed for the services in, and where he is located at a given time), SCCP global titles must be adapted dynamically for relevant users and the request for signal message transmission must be made to the SCCP in a dynamic and flexible manner. However, the above described problems in the related art cause difficulty in implementing such a global roaming method.

The above references are incorporated by reference herein where appropriate for appropriate teachings of additional or alternative details, features and/or technical background.

SUMMARY OF THE INVENTION

One embodiment of the invention solves at least the above problems and/or disadvantages and provides at least the advantages described hereinafter.

According to one embodiment, the present invention conducts the SCCP global title translation in an expeditious manner while supporting global roaming by translating a global title according to the relevant type of global title translation determined based upon whether there is a local global title specified in the signal message and whether the country code and/or the network code of the global title to be translated are identical with the country code and/or the network code of the local global title.

According to one embodiment, the present invention provides a method for operating and translating SCCP global titles comprising: upon receipt of a signal message, determining the type of routing to be made with respect to the received signal message; if it is determined that the received signal message will be routed according to the global title, determining whether the global title translation to be conducted is a translation for global roaming; and, if it is determined that the global title translation is to be conducted for global roaming, translating the global title according to the relevant type of global title translation determined based upon whether the country code and/or the network code of a local global title are identical with the country code and/or the network code of the global title to be translated.

The type of routing to be made with respect to the received signal message may be determined through the routing indicator included in the received signal message.

Whether the global title translation to be conducted is a translation for global roaming may be determined based upon whether the received signal message includes a local global title. The local global title comprises the country code and the network code of the signal network to which the global title translation node belongs.

According to one embodiment, if it is determined that the global title translation is not for the global roaming, the method for operating and translating SCCP global titles further comprises: translating the global title by searching the relevant global title translation database for the global title to be translated; determining whether the global title translation has been successful; if it is determined that the global title translation has been successful, conducting the signal message routing according to the translated global title; and, if it is determined that the global title translation has not been successful, discarding the received signal message and waiting for a new signal message transmission request.

According to one embodiment, the translation of the global title according to the determined type of global title translation comprises: determining whether the country code of the local global title is identical with the country code of the global title to be translated; if it is determined that the country code of the local global title is not identical with the country code of the global title to be translated, conducting the country code global title translation by searching the country code of the global title to be translated from the relevant global title translation database; determining whether the global title translation has been successful; and, if it is determined that the global title translation has been successful, routing the received signal message to the gateway for roaming between the relevant countries by using the translated value.

According to one embodiment, if it is determined that the country code of the local global title is identical with the country code of the global title to be translated, the method for operating and translating SCCP global titles further comprises: determining whether the network code of the local global title is identical with the network code of the global title to be translated; if it is determined that the network code of the local global title is not identical with the network code of the global title to be translated, conducting the network code global title translation by searching the network code of the global title to be translated from the relevant global title translation database; determining whether the global title translation has been successful; and, if it is determined that the global title translation has been successful, routing the received signal message to the gateway for roaming between the relevant mobile communication carriers within the same country by using the translated value.

According to one embodiment, if it is determined that the network code of the local global title is identical with the network code of the global title to be translated, the method for operating and translating SCCP global titles further comprises: conducting the mobile subscriber identification number translation by searching the mobile subscriber identification number from the relevant global title translation database; determining whether the global title translation has been successful; and, if it is determined that the global title translation has been successful, routing the received signal message to the signal network within the relevant mobile communication carrier by using the translated value.

Additional advantages and features of the invention will be set forth in part in the description that follows and in part will become apparent to those having ordinary skill in the art upon examination of the following or may be learned from practice of the invention. The features and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 1 illustrates the structure of an address indicator among various SCCP signal message types;

DETAILED DESCRIPTION OF PREFERRED EMBODIMENTS

Reference will now be made to preferred embodiments of the present invention as illustrated in the accompanying drawings. One embodiment of the present invention conducts a global title translation by determining a relevant type of global title translation. This determination may be based upon whether a relevant country's global title (local global title) has been defined and whether the global title to be translated is identical with the country code and/or the network code of the local global title.

Figure 2:
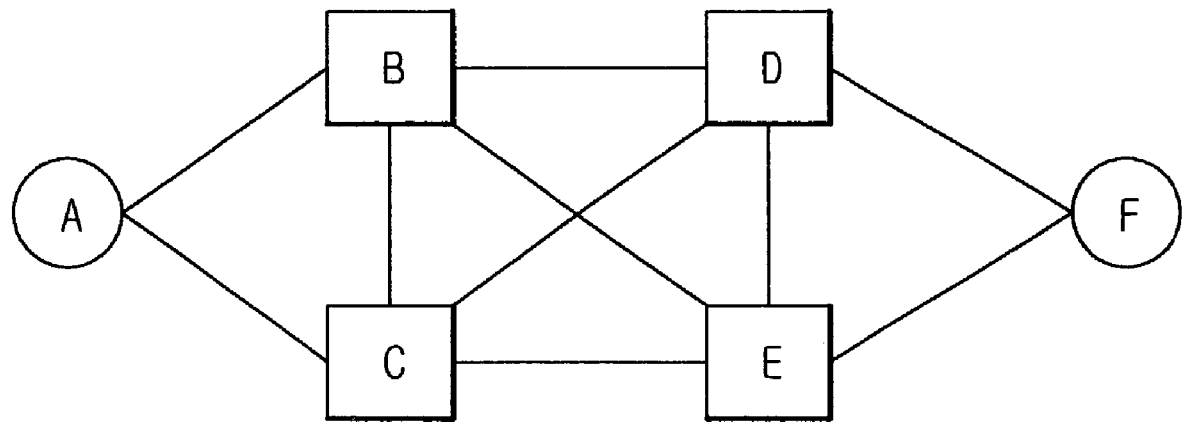
FIG. 2 illustrates an example of the structure of a No. 7 signal network.
Figure 3:
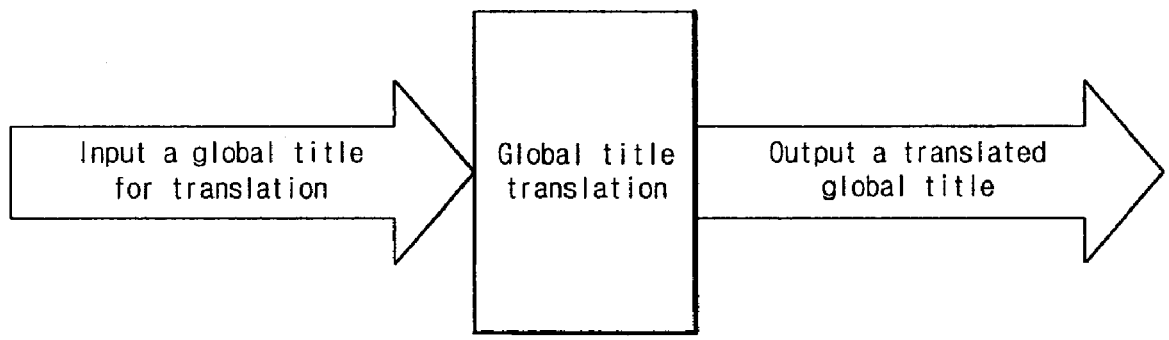
FIG. 3 illustrates a general method for operating and translating SCCP global titles in the related art.
Figure 4:
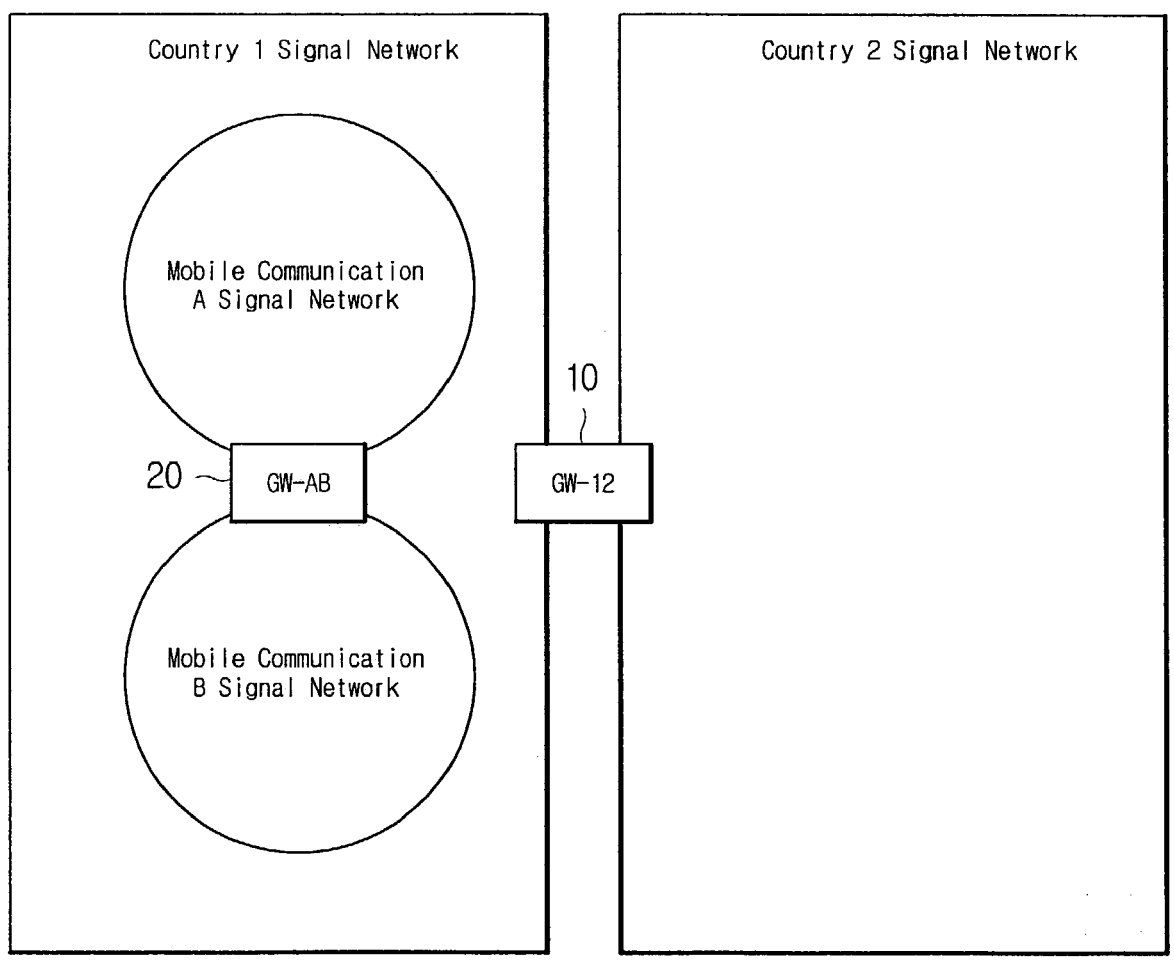
FIG. 4 illustrates the structure of a No. 7 signal network adopting a method for operating and translating SCCP global titles according to one embodiment of the present invention.

FIG. 4 shows the structure of a No. 7 signal network to which the present invention's method for operating and translating SCCP global titles may be applied.

The global roaming covering the mobile communication carrier A and the mobile communication carrier B within the country 1 signal network may be conducted through the gateway GW-AB (20) between the two mobile communication carriers. The global roaming covering the country 1 signal network and the country 2 signal network may be supported through the gateway GW-12 (10) connecting the two countries.

For the global roaming services, the ITU-T E.214 standard defines the MGT. The MGT is drawn from the IMSI defined under the ITU-T E.212 standard.

Figure 5:
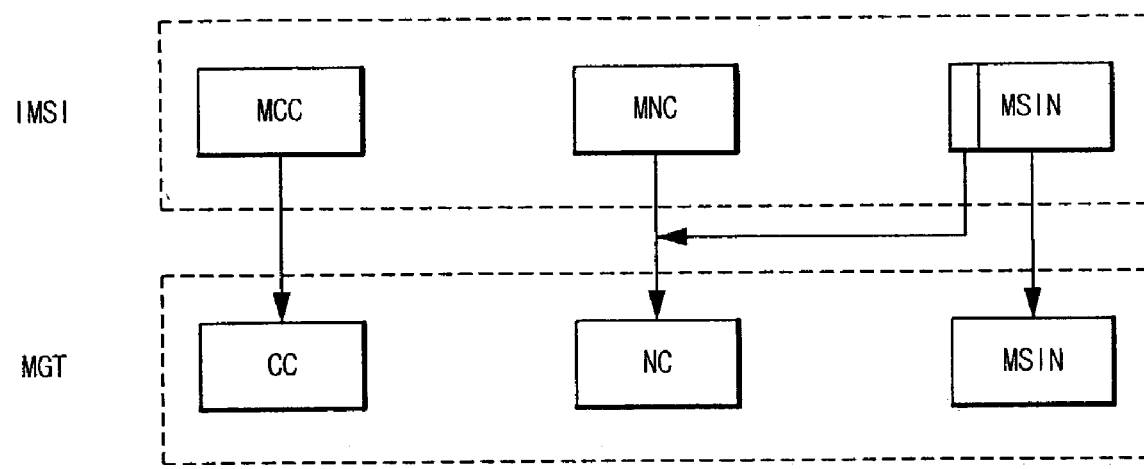
FIG. 5 illustrates the conversion of field values of the International Mobile Station Identity (IMSI) into field values used in the Mobile Global Title (MGT)

FIG. 5 shows the conversion of field values of an IMSI to field values used in an MGT.

According to one embodiment, the mobile country code (MCC) of the IMSI is converted into the country code (CC) of the MGT, the mobile network code (MNC) and a part of the mobile subscriber identification number (MSIN) of the IMSI is converted into the network code (NC) of the MGT, and the rest of the MSIN of the IMSI is converted into the mobile subscriber identification number (MSIN) of the MGT.

Figure 6:
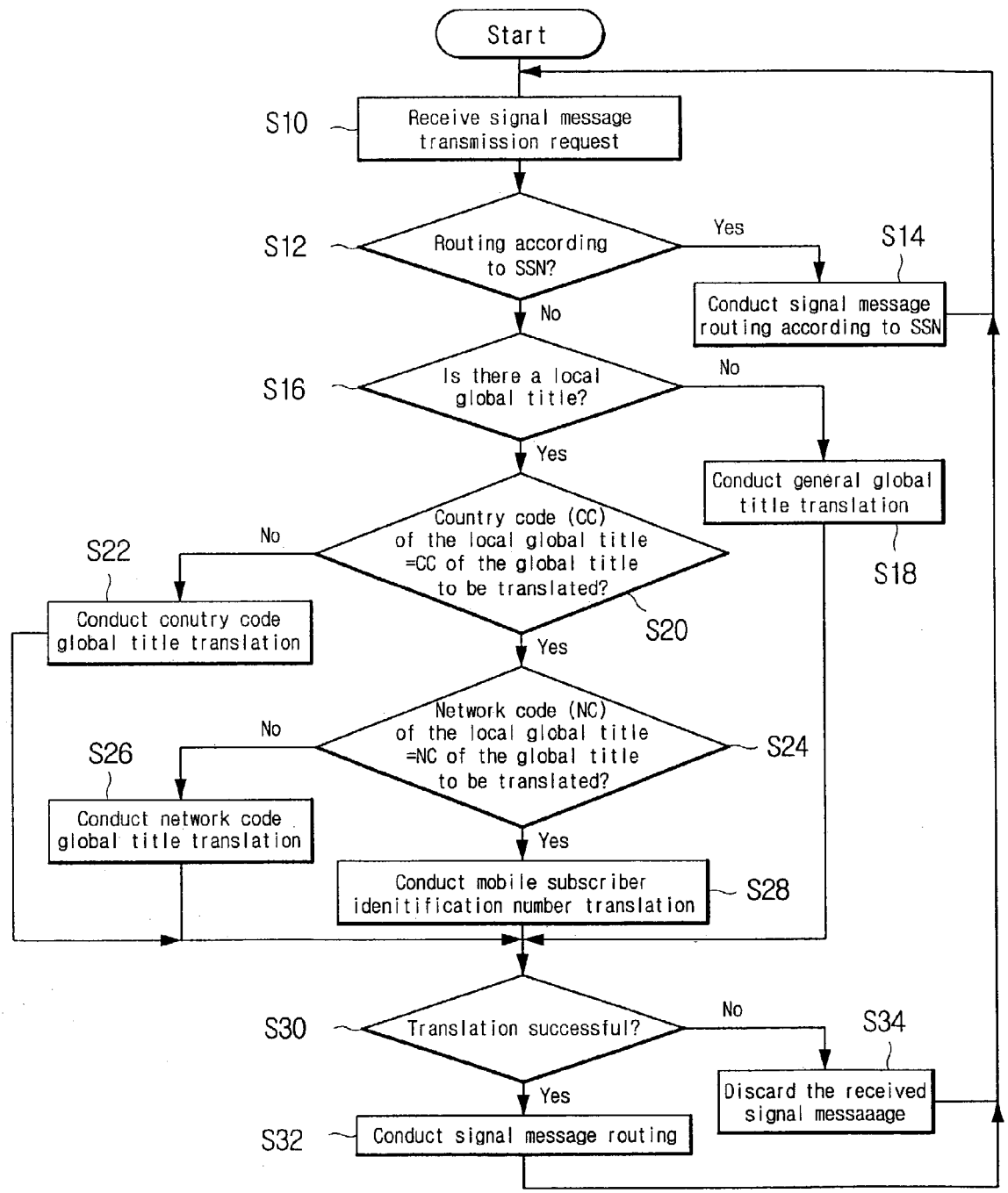
FIG. 6 illustrates a flow chart of a method for operating and translating SCCP global titles according to one embodiment of the present invention.

FIG. 6 illustrates a method for operating and translating SCCP global titles according to one embodiment of the present invention.

If a request for signal message transmission is received from a signal network or an SCCP user (S10), a determination is made on whether the received signal message should be routed according to the SSN or according to the global title (S12).

If the received signal message is to be routed according to the SSN, then the signal message routing is conducted according to the SSN (S14). Thereafter, the process flow goes back and waits to receive a new request for signal message transmission.

On the other hand, if the received signal message is to be routed according to the global title, a determination is made on whether the received signal message includes a local global title. The local global title can be added at any point in a signaling network including at a node where the translation is taking place. The local global title may allow the translation process to narrow the size of the translation database searched by focusing the search on specific portions of the database such as other countries, networks, or subscribers within the node's network. The local global title may comprise a country code and/or a network code corresponding to the node at which the translation determination is being made.

Thus, if a message is received at node A, which is located in country A on network A, a local global title may be added to the message with the country code for country A and the network code for network A. Then, if the received message has a global title with a country code that matches the country code of the local global title, the system knows the received message is destined for the country in which node A resides. In addition, if the global title network code matches the network code of the local global title, the system knows the message is desired for the network in which node A resides.

The local global title may comprise the country code and the network code of the signal network to which the relevant node translating the global title belongs. If the local global title has been specified, a special global title translation is conducted first for the purpose of the global roaming. If the special global title translation fails, a general global title translation is conducted.

If it is determined that no local global title has been included in the received signal message, a general global title translation is conducted by searching the global title translation database for a global title that is identical with the global title to be translated (S18) and translating the global title accordingly. Then, a determination is made on whether the attempted global title translation has been successful (S30).

If it is determined that the global title translation has been successful, the signal message received is routed based upon the global title translated by the general global title translation (S32).

On the other hand, if it is determined that the global title translation has not been successful, the signal message received is discarded (S34) and the process flow goes back and waits to receive a new request for signal message transmission.

If it is determined that there is a local global title specified in the received signal message, the type of global title translation to be conducted may also be decided. The decision on which type of global title translation is to be conducted may be made based upon the identity of the country code (CC) and the network code (NC) of the local global title in the received message and the country code (CC) and the network code (NC) of the global title to be translated.

Specifically, first, it is determined whether the country code (CC) of the local global title is identical to the country code (CC) of the global title to be translated (S20).

If it is determined that the country code (CC) of the local global title is not identical with the country code (CC) of the global title to be translated, a country code global title translation may be conducted by searching for the country code (CC) of the global title to be translated in a global title translation database (S22) and translating the global title accordingly. Then, a determination is made on whether the global title translation has been successful (S30).

If it is determined that the global title translation has been successful, the received signal message may be routed to a gateway corresponding to the country code searched (S32).

On the other hand, if it is determined based on the country code that the global title translation has not been successful, the received signal message is discarded (S34). Then, the process flow goes back and waits to receive a new request for signal message transmission.

If the country code (CC) of the local global title is identical with the country code (CC) of the global title to be translated, a determination is made on whether the network code (NC) of the local global title is identical with the network code (NC) of the global title to be translated (S24).

If it is determined that the network code (NC) of the local global title is not identical with the network code (NC) of the global title to be translated, a network code global title translation may be conducted by searching for the network code (NC) of the global title to be translated in a global title translation database (S26) and translating the global title accordingly. Then, a determination is made on whether the global title translation has been successful (S30).

If it is determined that the global title translation has been successful, the received signal message may be routed to a gateway for roaming between the relevant mobile communication carriers within the country corresponding to the country code of the local global title (S32).

On the other hand, if it is determined that the global title translation has not been successful, the received signal message is discarded (S34). Then, the process flow goes back and waits for a new request for signal message transmission.

If the network code (NC) of the local global title is identical with the network code (NC) of the global title to be translated, a mobile subscriber identification number global title translation may be conducted by searching for the mobile subscriber identification number (MSIN) in a global title translation database for the purposes of load distribution etc. (S28) and translating the global title accordingly. Then, a determination is made on whether the global title translation has been successful (S30).

If it is determined that the global title translation has been successful, the received signal message may be routed to a signal network of a mobile communication carrier corresponding to the network code of the local global title.

On the other hand, if it is determined that the global title translation has not been successful, the received signal message is discarded (S34). Then, the process flow goes back and waits for a new request for signal message transmission.

As described above, the global title translation may be conducted upon determining the types of global titles to be translated. This determination may be based upon whether the country code and the network codes of a global title to be translated are identical with those of a local global title. Accordingly, the global title translation databases used at the time of global title translation may be maintained and managed separately for country code global titles, network code global titles, mobile subscriber identification number global titles and general global titles according to the types of global titles to be translated.

Consequently, the SCCP global title translation may be conducted efficiently while supporting global roaming because the types of global title translations used may be determined based upon whether there is a specification of a local global title and whether country codes and/or network codes of the local global title and a global title to be translated are identical.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for routing signals, comprising:
   receiving an SCCP signal message;
   determining a type of global title translation based on a local global title of a global title translation node and an SCCP global title within the received SCCP signal message, the determined type of global title translation being a country code global title translation or a network code global title translation, the country code global title translation to translate a mobile country code of the received SCCP signal message and the network code global title translation to translate a mobile network code of the received SCCP signal message; and
   translating the SCCP global title according to the determined type of global title translation.

2. The method for routing according to claim 1, further comprising determining a type of routing based on a routing indicator in the received signal message.

3. The method for routing according to claim 1, further comprising determining a global roaming status.

4. The method for routing according to claim 3, wherein the determination of the global roaming status is based on the local global title.

5. The method for routing according to claim 1, wherein the local global title comprises at least one of a local global title country code and a local global title network code.

6. The method for routing according to claim 5, wherein the global title translation occurs at the global title translation node in a signal network and the local global title country code and the local global title network code correspond to the global title translation node of the signal network.

7. The method for routing according to claim 5, wherein the translation of the global title according to the determined type of global title translation comprises determining whether the local global title country code of the global title translation node is identical to a global title country code within the received SCCP signal message.

8. The method for routing according to claim 7, further comprising:
   searching for the global title country code and a corresponding translated global title in a country code global title translation database;
   translating the global title to the corresponding translated global title; and
   determining whether the global title translation has been successful.

9. The method for routing according to claim 7, wherein the translation of the global title according to the determined type of global title translation comprises determining whether the local global title network code of the global title translation node is identical to a global title network code within the received SCCP signal message.

10. The method of routing according to claim 9, further comprising:
    searching for the global title network code and a corresponding translated global title in a network code global title translation database;
    translating the global title to the corresponding translated global title; and
    determining whether the global title translation has been successful.

11. The method for routing according to claim 9, further comprising:
    searching for a mobile subscriber identification number and a corresponding translated global title in a mobile subscriber identification number global title translation database;
    translating the global title to the corresponding translated global title; and
    determining whether the global title translation has been successful.

12. The method for routing according to claim 1, wherein the determined type of global title translation being one of the country code global title translation, the network code global title translation or a mobile identification number translation.

13. A method for routing communication signals, comprising:
    receiving an SCCP signal message that includes an International Mobile Subscriber Identity (IMSI), the IMSI including a country code, a network code and a mobile subscriber identification number;
    determining a type of routing;
    determining a type of global title translation based on at least one of the country code or the network code within the received SCCP signal message, the determined type of global title translation being a country code global title translation or a network code global title translation; and
    translating an SCCP global title within the received SCCP signal message according to the determined type of global title translation.

14. The method for routing according to claim 13, further comprising determining a global roaming status based on a local global title.

15. The method for routing according to claim 14, wherein the local global title comprises one of a local global title country code and a local global title network code.

16. The method for routing according to claim 15, wherein the global title translation occurs at a global title translation node in a signal network and the local global title country code and the local global title network code correspond to the global title translation node in the signal network.

17. The method for routing according to claim 15, further comprising:
    searching a global title translation database for the global title and a corresponding translated global title;
    translating the global title to the corresponding translated global title; and
    determining whether the global title translation has been successful.

18. The method of routing according to claim 17, further comprising routing the received SCCP signal message according to the translated global title.

19. The method of routing according to claim 17, further comprising discarding the received SCCP signal message and waiting for a new signal message transmission request.

20. The method for routing according to claim 13, wherein the determined type of global title translation being one of the country code global title translation, the network code global title translation or a mobile identification number translation.

21. A method for operating and translating a SCCP global title, comprising:

upon receipt of an SCCP signal message, determining a type of routing to be made with respect to the received SCCP signal message, the SCCP message including a country code and a network code;

if it is determined that the received SCCP signal message will be routed according to a global title, determining whether a global title translation to be conducted is a translation for global roaming; and if it is determined that the global title translation is to be conducted for global roaming, translating the global title according to a relevant type of global title translation determined based upon whether one of the country code and the network code of a local global title of a global title translation node to perform the global title translation is identical with one of the country code and the network code of the global title within the received SCCP signal message to be translated.

22. The method for operating and translating the SCCP global title according to claim 21, wherein the determination of the type of routing to be made with respect to the received SCCP signal message is made through a routing indicator included in the received SCCP signal message.

23. The method for operating and translating the SCCP global title according to claim 21, wherein the determination on whether the global title translation to be conducted is the translation for global roaming is made based upon whether the received SCCP signal message includes the global title.

24. The method for operating and translating SCCP global title according to claim 23, wherein the local global title comprises one of the country code and the network code of a signal network to which the global title translation node belongs.

25. The method for operating and translating the SCCP global title according to claim 21, if it is determined that the global title translation is not for global roaming, further comprising:

translating the global title by searching a general global title translation database for a translated global title corresponding to the global title;

determining whether the global title translation has been successful;

if it is determined that the global title translation has been successful, conducting a signal message routing according to the translated global title; and if it is determined that the global title translation has not been successful, discarding the received SCCP signal message and waiting for a new signal message transmission request.

26. The method for operating and translating the SCCP global title according to claim 21, wherein the translation of the global title according to the determined type of global title translation comprises:

determining whether the country code of the local global title of the global title translation node to perform the global title translation is identical to the country code of the global title within the received SCCP signal message to be translated;

if it is determined that the country code of the local global title of the global title translation node to perform the global title translation is not identical to the country code of the global title within the received SCCP signal message to be translated, conducting the country code global title translation by searching for the country code of the global title to be translated in the relevant global title translation database and translating the global title accordingly;

determining whether the global title translation has been successful; and if it is determined that the global title translation has been successful, routing the received SCCP signal message to a gateway for roaming between relevant countries by using the translated global title.

27. The method for operating and translating the SCCP global title according to claim 26, wherein if it is determined that the country code of the local global title is identical to the country code of the global title to be translated, further comprising:

determining whether the network code of the local global title of the global title translation node to perform the global title translation is identical to the network code of the global title within the received SCCP signal message to be translated;

if it is determined that the network code of the local global title of the global title translation node to perform the global title translation is not identical to the network code of the global title within the received SCCP signal message to be translated, conducting a network code global title translation by searching for the network code of the global title to be translated in the relevant global title translation database and translating the global title accordingly;

determining whether the global title translation has been successful; and if it is determined that the global title translation has been successful, routing the received SCCP signal message to a gateway for roaming between relevant mobile communication carriers within the same country by using the translated global title.

28. The method for operating and translating the SCCP global title according to claim 27, wherein if it is determined that the network code of the local global title of the global title translation node to perform the global title translation is identical to the network code of the global title within the received SCCP signal message to be translated, further comprising:

conducting a mobile subscriber identification number translation by searching for a mobile subscriber identification number in the relevant global title translation database and translating the global title accordingly;

determining whether the global title translation has been successful; and if it is determined that the global title translation has been successful, routing the received SCCP signal message to a signal network within a relevant mobile communication carrier by using the translated global title.

29. A computer-readable medium having stored thereon a plurality of sequences of computer executable instructions, the plurality of sequences of computer executable instructions including sequences of computer executable instructions which, when executed by a computer processor, cause the computer processor to:

receive an SCCP signal message including a country code and a network code;

determine a type of global title translation based on a local global title of a global title translation node and an SCCP global title within the received SCCP signal message, the determined type of global title translation being a country code global title translation or a network code global title translation, the country code global title translation to translate the country, code of the received SCCP signal message and the network code global title translation to translate the network code of the received SCCP signal message; and translate the SCCP global title according to the determined type of global title translation.

30. The computer-readable medium according to claim 29, wherein the determined type of global title translation being one of the country code global title translation, the network code global title translation or a mobile identification number translation.

* * * * *